April 16, 1935. F. C. BARGAR 1,997,849
DISHWASHING APPARATUS
Filed Aug. 17, 1929 4 Sheets-Sheet 1
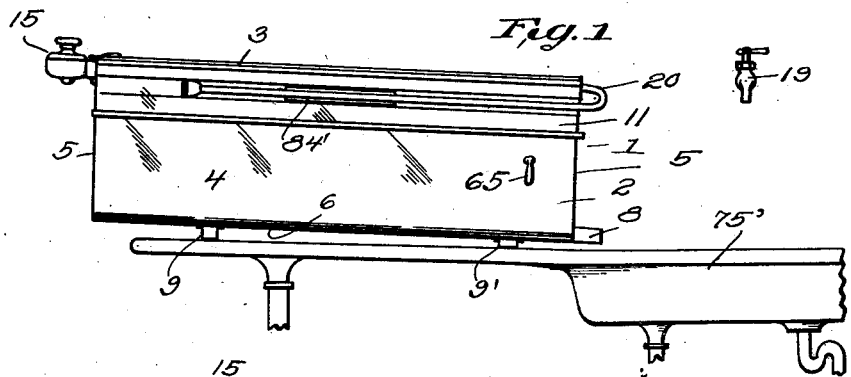
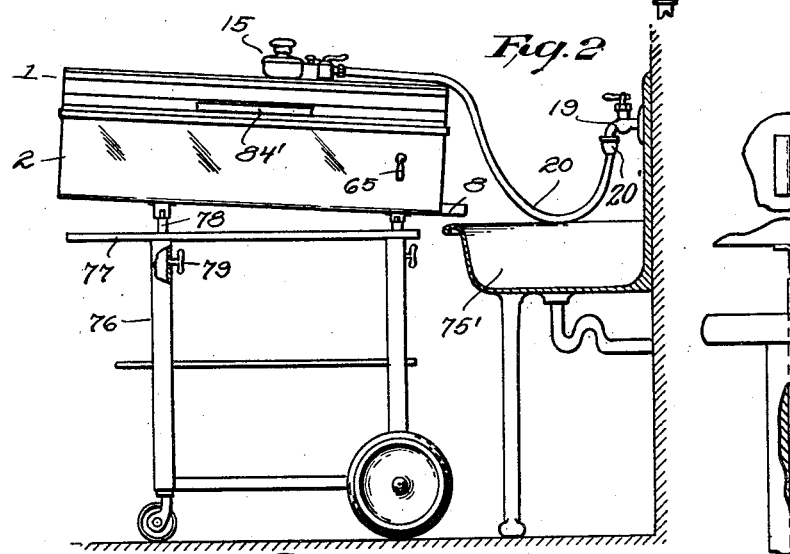
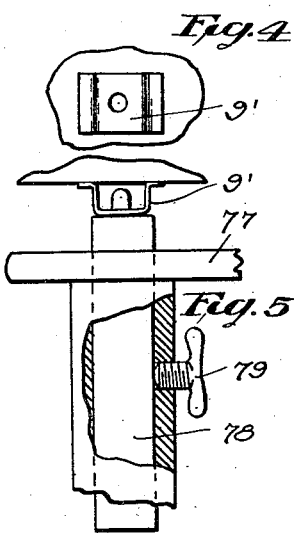
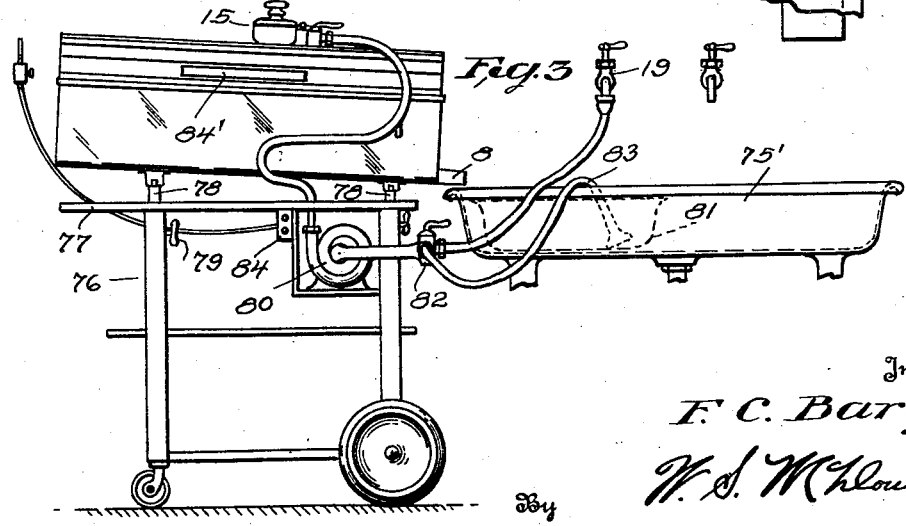
Inventor
F. C. Bargar
By W. S. McDowell
Attorney April 16, 1935.  F. C. BARGAR  1,997,849
DISHWASHING APPARATUS
Filed Aug. 17, 1929  4 Sheets-Sheet 2
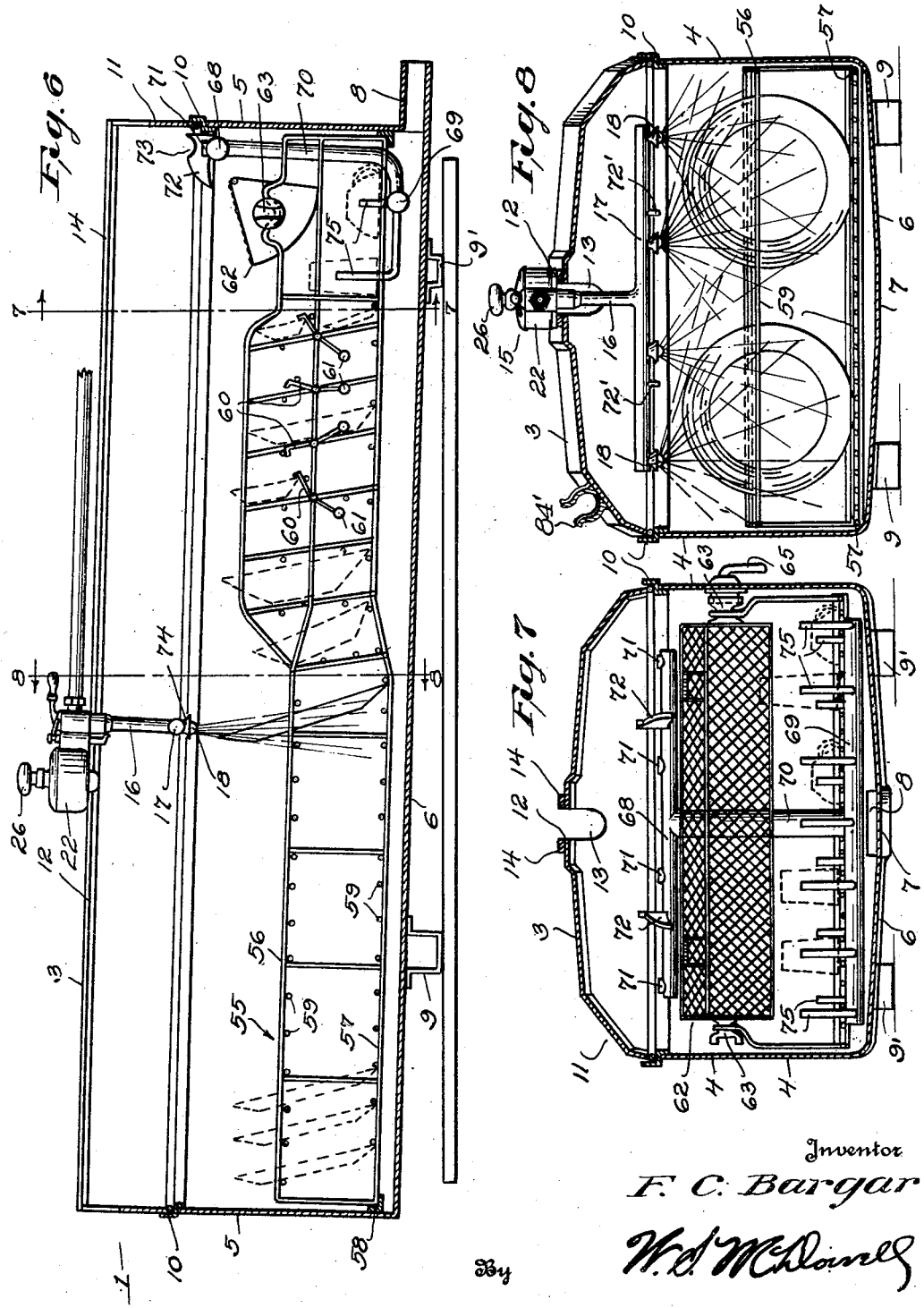

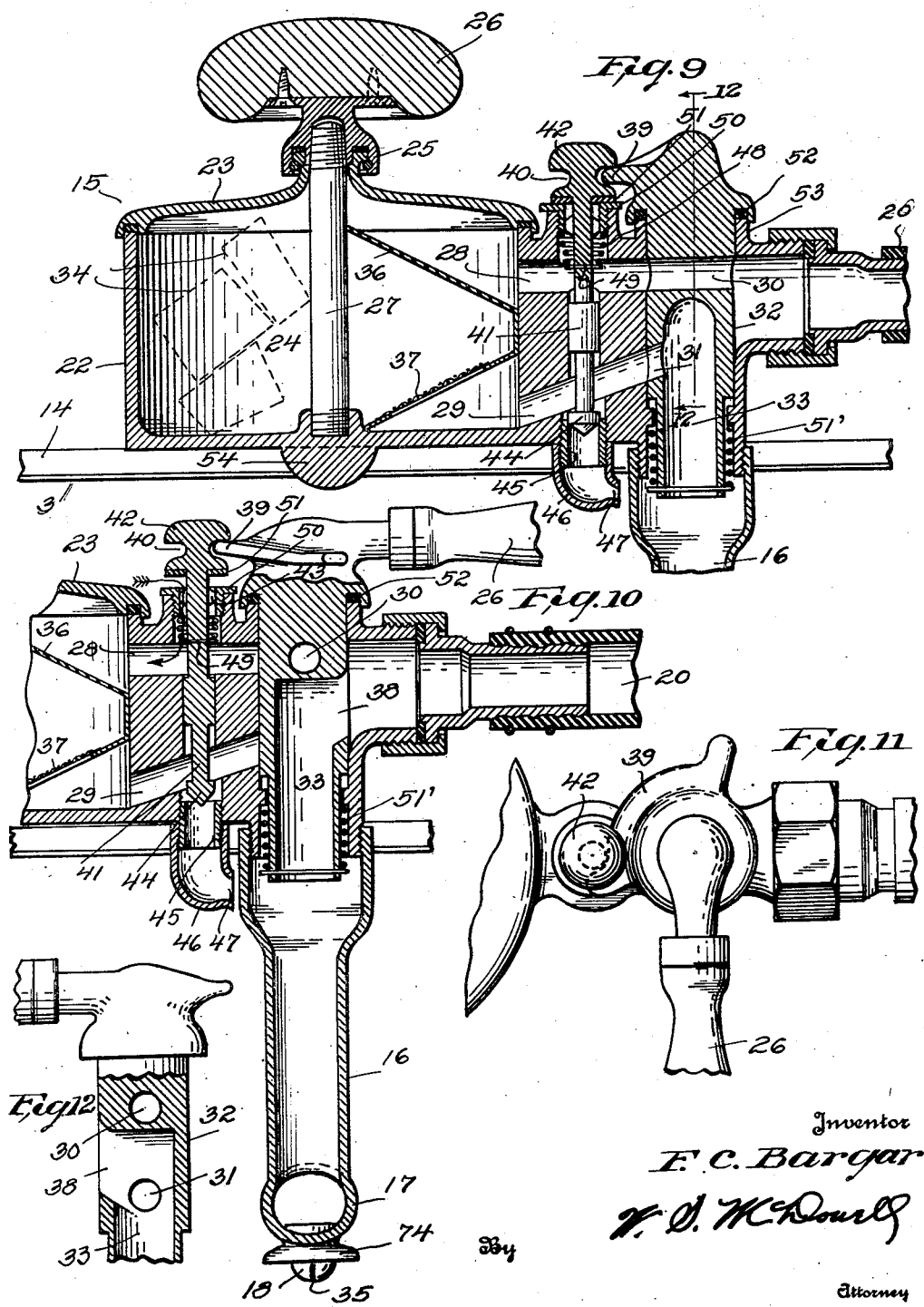

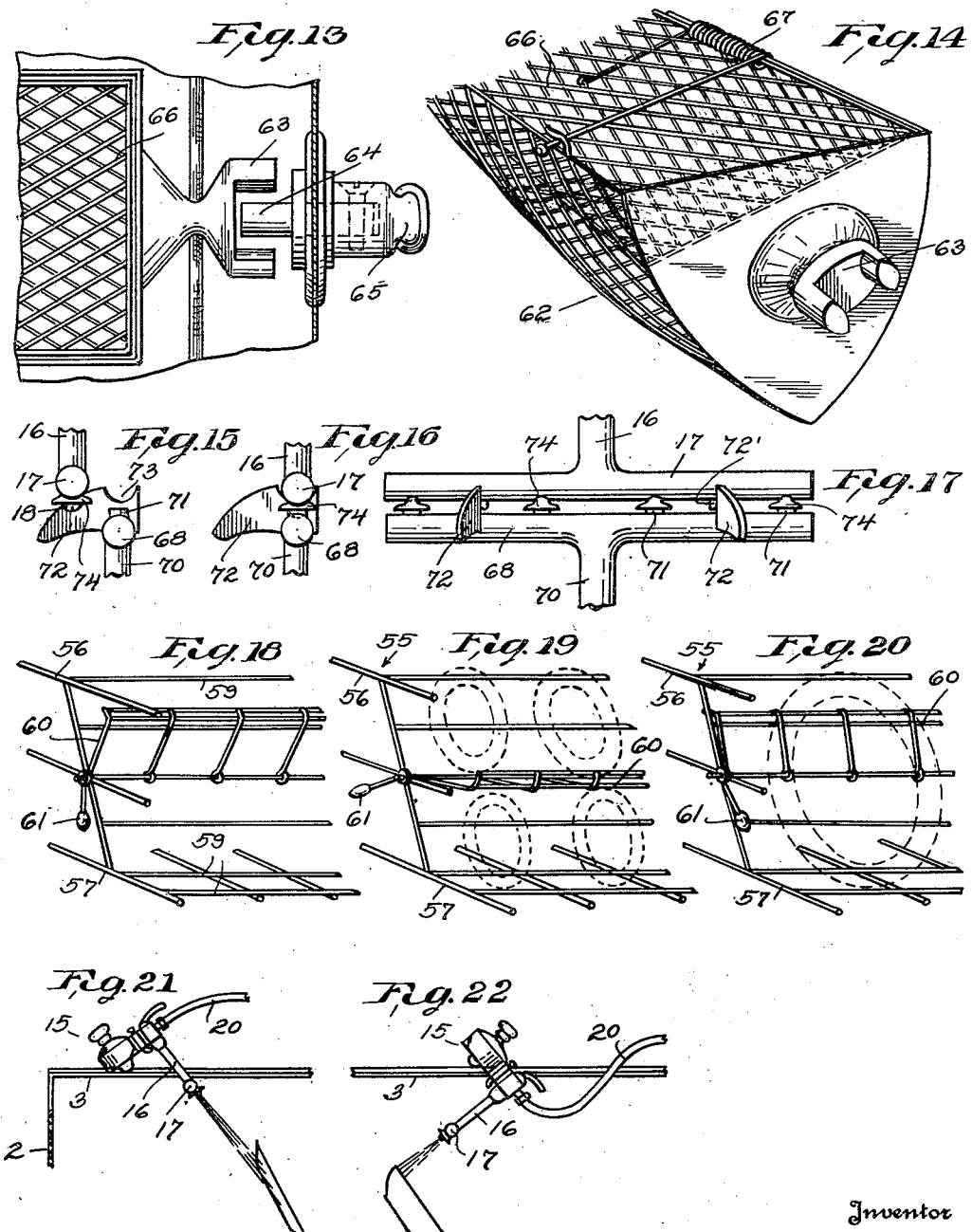

Patented Apr. 16, 1935

1,997,849

UNITED STATES PATENT OFFICE 1,997,849

DISHWASHING APPARATUS

Frederick C. Bargar, Columbus, Ohio

Application August 17, 1929, Serial No. 386,670

19 Claims. (Cl. 141—9)

This invention relates to improvements in dishwashing apparatus for household or domestic use and is particularly directed to the portable type which may be detachably connected to the hot or cold water faucet of a water main. In this form of the invention the water is sprayed over the dishes or utensils in said apparatus and passed or drained therefrom into a sink or other disposal.

The serious objections to dishwashing apparatus heretofore provided is that water mixed with food particles and grease is maintained at a certain level in the apparatus and when drawn off leaves the apparatus foul and in need of cleaning.

An object of this invention is to eliminate this objection by providing a receptacle capable of holding a quantity of dishes, glasses or silverware at the same time and directing forceful sprays of water over all sides of the entire contents of the receptacle so as to dislodge the food particles from the dishes and other utensils, and to provide for a direct and complete drainage of the dishwater from the apparatus without giving any refuse matter or grease an opportunity to settle or adhere so that the apparatus does not require cleaning even after repeated use after a long period of time.

Another object of the invention lies in the provision of a dishwasher construction whereby the clean water spray may be readily changed into a soapy kind and vice versa, and regulated to give the solution desired for the cleaning operation of the dishes within the washer in the most advantageous and economical manner.

A further object resides in providing a support for the washer which may be adjusted to hold the latter at a comfortable working level so that the user is not compelled to bend over either in loading, operating or unloading the washer.

A still further object is to provide means for holding the dishes in a novel manner during the cleaning thereof so that the same may be thoroughly soaped and rinsed on all sides and held firmly in place during such operation without the danger of breakage.

With these and other objects in view which will appear as the description proceeds, the invention consists in the novel features of construction, combinations of elements and arrangements of parts hereinafter fully described and set forth in the appended claims.

In the accompanying drawings:

Figure 1 is a side elevation of a dishwashing apparatus constructed in accordance with the present invention and installed on the drain board of the sink in a position for use but not attached to the main, Figure 2 is a similar view of the apparatus mounted on a movable support in a position adjacent the sink and attached for use, Figure 3 illustrates the apparatus mounted on a movable support equipped with a motor driven pump, Figure 4 is a bottom view in detail of one of the leg members of the dishwasher, Figure 5 is a detailed view partly in section of the adjustable connection between the dishwasher leg and the movable support illustrated in Figures 2 and 3, Figure 6 is a vertical longitudinal section of the dishwasher showing the arrangement of parts therein, Figure 7 is a transverse sectional view taken on the line 7—7 of Figure 6, Figure 8 is a similar view taken on the line 8—8 of Figure 6, Figure 9 is a vertical sectional view on an enlarged scale taken through the sprayer head and associated soap container with the parts set to pass soapy water therethrough, Figure 10 is a similar view with the parts arranged to supply clear water and also for draining the soap container, Figure 11 is a view in plan of a valve in connection with said sprayer head, Figure 12 is a vertical sectional view taken through the valve on the line 12—12 of Figure 9, Figure 13 illustrates one end of a transversely positioned wire mesh basket within the container and the clutch connecting it with an operating handle positioned outside of the apparatus, Figure 14 is a perspective view of the basket illustrated in Figure 13 showing the spring pressed lid for the basket depressed to meet the contents disposed within the basket, Figures 15, 16 and 17 illustrate means for aligning a pair of manifolds used in connection with the apparatus, Figures 18, 19 and 20 show various positions of folding dish racks also used within the apparatus, and Figures 21 and 22 illustrate the sprayer head tilted to direct liquid spray at angles with respect to the dishes.

Referring more particularly to the drawings, the numeral 1 designates the apparatus in its entirety which consists of a rectangular container 2 including top, side and end walls, 3, 4 and 5 respectively, and a sloping bottom 6. The bottom 6 slopes into a central flat portion 7 which ends in a drain spout 8 protruding from one of the end walls and positioned at the lower end of the bottom 6. The bottom may be equipped with leg members 9 and 9' of which the former are higher in order that the bottom will slope towards the drain spout. Formed with the upper ends of the container 2 is a flange 10 in which the removable lid 11 is positioned and which serves to hold the container and the lid thereof together in liquid tight relationship during the operation of the apparatus. In the top wall 3 of the lid 11 is formed a slot 12 positioned longitudinally and centrally thereof and extending the full length of the top wall and a short distance down each end wall of the lid, as indicated at 13, the purpose of which will appear later. Provided at each side of the slot are rails 14 which serve to strengthen the lid and to form guides for a slidable sprayer head 15 which has connected thereto through a vertical conduit 16 a transversely positioned manifold 17. This manifold has its under side provided with spaced nozzle outlets 18 provided with slotted orifices 35 through which the water issues in the form of a flat spray in a forceful and effective manner over the dishes.

Connecting the sprayer head 15 and the faucet 19 of the water main (not shown) is a flexible hose or conduit 20, which may be connected to said faucet by means of a cup shaped rubber member 20' formed with the end of the hose 20 and which will frictionally engage the exterior side of the faucet outlet. By means of the hose 20 the sprayer head may be supplied with water which by way of the manifold and nozzles may be sprayed over the dishes as the head is moved longitudinally of the slot 12. The sprayer head 15 is formed to include a soap container 22 having a removable lid 23 through which the soap may be inserted into the soap chamber 24. The lid is held in place by means of a swivelled threaded connection 25 of the handle 26 which is centrally positioned on the lid 23 and engages the threaded upper end of a stud 27 positioned axially within the soap chamber. By means of the swivelled connection between the handle 26 and the lid 23, the latter may be held stationary during the rotation of the handle for clamping the lid on said container in liquid tight relation without causing undue wear upon the gasket carried by the outer edge of the lid 23.

Communicating with the soap chamber 24 is a pair of ports 28 and 29 of comparatively small cross-sectional area which register with a pair of similar ports 30 and 31 formed in the rotatable valve member 32. The port 31 communicates with a vertical bore 33 formed axially of said valve member and which has the lower open end communicating with the vertical conduit 16 of the manifold 17. It will thus be seen that water may be passed from the hose 20 to the ports 30 and 28 into the soap container and then back through the ports 29 and 31 into the bore 33 and out through said manifold. The water thus passing through the soap container dissolves some of the soap 34 indicated by dotted lines, forming a solution of soap and water which will emerge at the nozzle orifices 35 to aid in the cleansing operation of the dishes. A baffle plate 36 may be positioned within the soap container to deflect the water entering therein over the soap, and a screen 37 may be placed covering the outlet port 29 to prevent particles of soap from entering the manifold and clogging the nozzle orifices thereof.

After the soaping operation is performed the valve 32 is then moved to a position indicated in Figure 10, closing the ports 28 and 29 leading into the soap chamber. The water from the hose 20 in this instance enters the vertical bore 33 through the inlet port 38 of the valve member and is thus passed directly to the manifold 17 to emerge at the nozzle orifices 35 under full pressure, as the port 38 is of such size as not to check or hinder the full flow of water therethrough. The valve member 32 when moved into this position through the action of the cam and groove connection 39 and 40 will thus raise the release valve 41 to a position permitting air from the atmosphere to pass under the head 42 and downwardly about the reduced stem between the guides 43 into the soap chamber 24 of the valve, as is indicated by the arrow a. Air thus introduced into the soap chamber 24 will break the vacuum therein, permitting the water to be drained therefrom. The raising of the valve 41 also withdraws the lower conical end 44 of the stem from engagement with the threaded sleeve 45 which enables any water trapped in the soap container to run out by gravity through the port 29 and the sleeve 45 to the cup shaped outlet 46, from whence it emerges through the orifice 47 into the container 2 of the apparatus.

A spring 48 is positioned around the stem of the valve 41 and disposed between a pin 49 arranged transversely of the valve stem and the bushing 50 threaded into the upper wall of the valve body. The spring serves to insure proper seating and positioning of the gasket 51 of the head 42 upon the upper surface of the bushing thus preventing the leakage of water during its passage into the soap container. The valve structure including the valve 41, the bushing 50 and the spring 48 may all be assembled into one unit, positioned and placed within the valve body and held securely in place by the threaded connection between the valve casing and the bushing 50. Likewise, a spring 51' is positioned around the lower end of the valve member 32 and positioned so as to hold the valve and gasket 52 carried thereby in frictional engagement with the upper circular edge of the collar 53 formed with the upper wall of the valve casing.

To hold the manifold 17 in its substantially transverse position within the container 2, the bottom of the soap container 22 is formed with a depending projection 54 which together with the vertical conduit 16 serves to guide the sprayer-head within the slot 12. The projection 54 also serves to permit the rocking action of the sprayer-head into angular positions as indicated in Figures 21 and 22 of the drawings, thus permitting the sprays issuing from the nozzles of the manifold 17 to strike all sides and surfaces of the dishes or contents within the container in order to clean the same in a most effective manner.

Positioned within the container 2 is a dish rack 55, which includes vertically spaced longitudinally disposed rods 56 and 57. The rods 57 rest upon shoulders 58 which are so positioned as to hold the racks spaced from the bottom 6 of the container. Connecting the upper and lower rods 56 and 57 are transversely spaced rods 59 which serve to hold the dishes in a substantially vertical position permitting the water spray to produce a shearing action on the food particles in order to dislodge the same from the dishes.

In order to hold small dishes in an elevated position near the outlet of the sprayer-head, the rack 55 is provided with supplemental racks 60 which are pivotally mounted at substantially halfway the height of the rack 55. Each of these racks is provided with a weight 61 which normally holds the rack in what may be called a slightly opened position as indicated in Figure 18, so that a small plate or dish may be inserted and cause the rack to assume a position as illustrated in Figure 19. If, however, a large plate or dish is inserted in the space in front of the rack the same will assume the position disclosed in Figure 20.

Also carried at one end of the rack 55 is a transversely journaled basket 62, for holding silverware or other cutlery. The basket is formed from wire mesh having its ends closed so that the pointed ends of forks or knives cannot slide through and interfere with the rotation of the basket. Carried by the end walls of the basket are slotted stub shafts 63, one of which intermeshes with a ridge 64 formed with the inner end of the handle 65, journaled for rotation in one of the side walls of the container. By means of the handle 65, the basket may be rotated so as to expose all surfaces of the contents within the basket to the water sprays of the sprayer-head. The basket 62 may also be formed with a spring-pressed lid 66 which is hinged at one edge and is capable of extending inwardly within the basket until it encounters the basket's contents. One end of the spring 67 is connected with the lid 66 while the other serves as a handle by which the lid may be opened and the contents of the basket removed. Due to the depressed position of the spring-pressed lid the contents within the basket are prevented from moving as the basket is revolved.

In order to clean glasses, cups or other deep vessels there is positioned at one end of the container a water directing mechanism including upper and lower spaced manifolds 68 and 69, which are rigidly joined by a vertical conduit 70. The manifold 68 may be secured to the end wall 5 by hook shaped brackets (not shown) carried thereby. Since the two manifolds are rigidly connected by the conduit 70, the above mentioned brackets will support them both. The upper of said manifolds is provided with spaced sockets 71 in open communication with said manifolds through the connection of the conduit 70. In order to make a liquid connection between this manifold and the sprayer head 15, the former is provided with upwardly inclined guides 72 with which the manifold 17 of the sprayer head is engaged so as to raise the same and position the nozzles 18 within the sockets 71. The manifold 17 may be provided with a pair of downwardly projected pins 72' and the guides 72 may be flared outwardly and engage the pins so as to properly align the nozzles 18 with the sockets 71. The guides 72 are also formed with a recess or cradle 73 into which the manifold 17 is dropped, causing all nozzles to enter the sockets of the manifold 68. The nozzles 18 may also be formed with skirt sections 74 to prevent upward splashing of the water during its passage from the manifold 17 to the manifolds 68 and 69. The lower manifold 69 is provided with a plurality of spaced upwardly directed jets 75, over which are placed glasses, cups or other deep vessels in an inverted manner so that water emerging from said jets will engage the interior surfaces of such vessels.

From the foregoing it will be seen that the sprayer head 15 may be moved in various positions for spraying and cleaning the contents of the washer, and by the provision of the slot in the top wall of the washer and which extends from one end to the other thereof, the sprayer head first, moves longitudinally of the slot and is rocked therein to direct the liquid spray downwardly and angularly over all sides of the dishes positioned vertically within the racks, second, the head may also be moved into a position where the spray can be directed on the contents within the wire basket and third, for positioning the sprayer head in such relation with the stationary manifold within the container that the water will be directed upwardly into inverted vessels from where it may be drained off to a suitable point of disposal.

The apparatus is preferably positioned upon the drain board of a kitchen sink 75', but may be carried by a movable support 76. In both cases however, the apparatus is so positioned that the spout 8 thereof will overhang the edge of the sink so that the drain of the sink may be used to carry away waste water from the apparatus, thereby eliminating the need of special plumbing, and to facilitate easy installation of the apparatus. These features are considered important as the practicability of dishwashing apparatus for use in home kitchens depends largely upon the convenience with which it can be installed, moved, used and disconnected and disposed of when not in use. The movable support 76 has its top platform 77, on which the receptacle 2 is positioned, formed with upright pins 78, which may be inserted in openings formed in the legs 9 and 9' fixed to the bottom of the container 2. The pins may be adjusted vertically in the frame structure of the support and held therein by means of thumb screws 79. The container may thus be raised to any height desired and tilted to any angle towards the kitchen disposal sink.

The apparatus heretofore described is adapted to be connected with the water supply of the average city service and owing to the total area of all the slots in the nozzles being considerably less than the area of the passageway leading to the nozzles, the sprays emerge from the slotted nozzles at the full force of the water pressure, and therefore the average city pressure is sufficient. However, in localities where the water pressure is abnormally low, an electrically driven pump 80 may be installed on a movable support, as is disclosed in Figure 3 of the drawings. This pump may receive its source of supply from a water main and deliver water to the apparatus at a suitable pressure. Should it be desired to collect some of the water to be used repeatedly, a vessel 81 may be positioned as shown by dotted lines to receive water from the drain spout 8. A valve 82 in this instance is turned to disconnect the hose leading to the water main and to connect the hose 83 with the pump 80. An electrically driven motor may be used to operate the pump and which may be controlled by the switch 84. In houses where there is electricity but no running hot water the hose leading to the water main may be eliminated, and a vessel filled with hot water may be used as a source of supply. The vessel may be filled repeatedly and the water used for washing, for soaping and for rinsing.

After placing the dishes in the rack 55, the cups and glasses in an inverted position resting upon the open mesh floor of the rack, each cup and glass over the jets 75, and the knives, forks and spoons in the basket 65, the method of operating the dishwasher is as follows: The lid 11 is closed and the hose 20 attached to the hot water faucet 19 which is then turned on in full. With the handle of the valve 32 in the position shown in Figure 10, the full force of the hot water is delivered to the manifold 17 and emerges from the nozzle thereof in strong, overlapping flat fan-shaped streams which form a stripping and washing curtain of water from one side of the receptacle to the other. When the sprayer head by means of heat insulated handle 26 is moved from one end of the apparatus to the other in the slot 12, this curtain formation of overlapping flat streams passes over and downward through the entire interior space of the receptacle 2.

By tilting the sprayer head as shown in Figures 21 and 22 the curtain of sprays is caused to strike the contents of the rack 55 at various angles making the contact of the streams with the dishes at more acute or obtuse angles and making it feasible to wash the backs of the upright dishes as well as the front and also the inside of overhanging parts of deeper dishes. When the movable spray manifold 17 has reached the position above the basket 55, the basket may be turned over by the handle 67 in order to present all sides of its contents to the action of the forceful sprays immediately above the basket. It will also be seen that when the manifold 17 is moving towards the extreme lower end of the apparatus it is raised by the guides 72 and connected with the manifold 68 so that the water is then delivered in the form of upright fountains through the jets 75 into and against the inside of the inverted cups and glasses.

After the above operations have been completed, the valve 32 is then turned to the position shown in Figure 9 and the operations are repeated with a soapy solution resulting from the water having passed through the soap container 22. The valve 32 may then be returned to the position shown in Figure 10, and the first operation is again repeated with clear water, rinsing the contents of the receptacle. During the rinsing operation the water remaining in the soap container has escaped through the orifice 47 owing to the lifting of the release valve 41 and the cam 40 heretofore described. After this operation, which is the final one, the hose 20 is then disconnected from the faucet and the sprayer head may then be moved to occupy the slot extending down the sides of the lid 11, as indicated in Figure 1 of the drawings. As the sprayer head 15 occupies the slot in the side wall of the lid the hose 20 will then have its major portion positioned within the slot 12 so as to be hidden from view when not in use. The outer end of the hose may be frictionally held within the clamp 84' positioned to one side of the lid 11. The lid may thus be raised and the basket 62 lifted from the apparatus and placed on a drying rack over the kitchen stove (not shown) and its contents, all knives, forks and spoons, dried without wiping. The cups and glasses may be wiped in the ordinary way and upright dishes may be allowed to dry in their upright position within the rack.

Due to the fact that all of these operations of washing, soaping and rinsing the contents of the apparatus are accomplished in a very short time, it is evident that there is produced a practical and efficient apparatus for cleaning dishes.

What is claimed is:

1. In a dishwashing apparatus, a container comprising closed end walls, a sloping bottom wall and a top wall provided with a slot extending longitudinally and centrally thereof, a dish rack within said container spaced from said sloping bottom wall, a sprayer head provided with a spray orifice and including a soap container, said head being slidably positioned within said slot, a conduit connecting said sprayer head with a source of liquid supply, a valve in said sprayer head through which the liquid may be by-passed through said soap container to the spray orifice, and an outlet for the liquid from said container disposed at the lower end of said sloping bottom wall.

2. In a dishwashing apparatus, a container for holding dishes, said container including a top wall formed with a longitudinal slot therein extending the full length of said wall, a sprayer head provided with a spray orifice and including a soap container slidably positioned within said slot, said head also being provided with a pair of ports communicating with said soap container, means connecting said sprayer head with a source of water supply, and a valve in said sprayer head for controlling said ports whereby the water may be directed through one of said ports into the soap container and back through the other port and said valve to the spray orifice.

3. In a dishwashing apparatus, a container, a rack for supporting dishes within said container, a sprayer head positioned for sliding movement within a slot formed in the top of said container, a horizontally disposed manifold carried by said sprayer head, spraying nozzles depending from said manifold, a stationary manifold in said container arranged in a plane below said first named manifold, sockets provided in the top of said stationary manifold, means formed with said manifolds to provide registration with one another for positioning said nozzles within said sockets, and an upwardly directed outlet nozzle in communication with said stationary manifold for directing liquids conducted through said manifolds into inverted dishware supported by said rack.

4. In a dish washing apparatus, a substantially rectangular casing having a removable top formed with a slot extending longitudinally and centrally thereof, means for holding dishes in a substantially vertical position within said casing, a sprayer head positioned for sliding movement within said slot, a manifold carried by said head and arranged transversely of said casing, a plurality of downwardly directed nozzles in said manifold, and means formed with said head and co-operating with the sides of said slot for holding said manifold in a position transversely of said casing during the sliding movement of said sprayer head, said means also serving to permit of tilting action on the part of said head and manifold so that the liquid spray from said nozzle may engage with all sides of the dishes within said casing.

5. In a dishwashing apparatus, a container for holding dishes, a transversely arranged stationary manifold disposed within said container and having upwardly directed jets in communication therewith, a sprayer head having a transversely arranged manifold and slidably positioned within a longitudinal slot formed in one of the walls of said container, means connecting said sprayer head with a source of liquid supply, and means formed with said manifolds for aligning one with the other whereby the liquid from said sprayer head may be passed to said stationary manifold and directed upwardly to said jets.

6. In a dish washing machine, a container having a slot in one wall extending longitudinally of said container, and a sprayer head slidable in said slot and formed for rocking movement about an axis extending substantially at right angles to said slot and lying in the same plane as said slot.

7. In a dishwashing apparatus, the combination of a container having a removable lid, said lid including a top and end walls, and having a slot extending longitudinally of said top wall and downwardly a distance in the end walls, and a spray head slidable in said slot and adapted to be positioned in one of the heads of the slot formed in the end walls when not in use.

8. In a dishwashing machine, a container, dish racks within said container, a stationary manifold provided with upwardly directed spraying nozzles, a spray head movable longitudinally of said container and means for connecting said head with said manifold for fluid passage therethrough.

9. In a dishwashing machine, a container, dish racks within said container, a stationary manifold provided with upwardly directed spraying nozzles, a spray head movable longitudinally of said container, and means connecting said spray head with said manifold when the former is moved to a predetermined position for conducting water from said head to said manifold and thus directing it upwardly through said nozzles into inverted cups and glasses positioned upon said racks.

10. In a dish washing machine, a container, dish racks within said container, a stationary manifold provided with an opening in its upper wall, upwardly directed nozzles arranged toward said racks and in communication with said manifold, a spray head provided with a jet movable longitudinally of said container, and guide means for aligning the jet on said spray head with the opening in said manifold.

11. In a dishwashing machine, a container having a slot in its top wall, a spray head slidably positioned in said slot, a dish rack within said container, a silverware basket arranged near one end of said rack and positioned transversely thereof for rotary movement about a horizontal axis, means disposed exteriorly of said container for rotating said basket to expose the contents thereof to the spray from said head, and a conduit connecting said spray head with a source of liquid supply.

12. In a dishwashing machine, a substantially rectangular container having a slot in its top wall, a spray head slidably positioned in said slot, a dish rack extending longitudinally of and arranged within said container, a silverware basket arranged near one end of said rack and positioned transversely thereof for rotary movement about a horizontal axis, and means for rotating said basket in order that all sides of the ware within the basket may be submitted to the action of the spray from said head.

13. A dishwashing machine, a container, a spray head mounted for longitudinal movement in the top of said container, a dish rack arranged in said container, a silverware basket arranged transversely of said rack and positioned therein for rotary movement about a horizontally disposed axis, a lid for said basket, operating means positioned exteriorly of said container for rotating said basket, and means for detachably connecting said basket with said operating means.

14. In a dishwashing machine, a container, a spray head mounted for longitudinal sliding movement within a slot formed in the upper portion of said container, a dish rack arranged in said container, a detachable silverware basket positioned transversely of said container and mounted for rotation about a horizontally disposed axis, said basket being provided with closed ends, a lid for said basket, and means arranged exteriorly of said container for rotating said basket.

15. In a dishwashing apparatus, a container, a spray head mounted for longitudinal movement in the upper portion of said container, a dish rack arranged in said container, a detachable silverware basket positioned transversely of said container and mounted for rotation about a horizontally disposed axis, means positioned exteriorly of said container for rotating said basket, a hinged lid for said basket adapted to swing into said basket for engagement with the contents therein, and spring means for holding said lid in a content engaging position.

16. In a dishwasher, a rectangular receptacle having a drain opening, an open mesh silverware basket positioned within said receptacle and mounted to rotate about a horizontal axis, a lid on said basket, and means for forcing said lid inside of said basket against the contents thereof.

17. In a dish washing apparatus, a container for holding dishes, a cover for said container including top and end walls, said cover being provided with a longitudinal slot in its top wall extending the full length of said top wall and partly down said end walls, a sprayer head slidably arranged in said slot and formed for rocking movement therein about a horizontal axis extending substantially at right angles to said slot, and downwardly directed spray nozzles provided on said head and arranged substantially perpendicularly to said horizontal axis.

18. In a dishwashing apparatus, a container, a cover for said container including top and end walls, said cover being provided with a slot extending longitudinally the full length of said top wall and downwardly a distance in at least one of said end walls, and a sprayer head positioned for sliding movement in said slot and adapted for reception within the portion of the slot formed in said end wall when the sprayer head is not in use.

19. In a dish washing apparatus, a casing having a slot formed in its top wall and down a distance in the end walls thereof, and a sprayer head positioned for sliding movement in said slot and adapted to be positioned in either end of the slot formed in the end walls when not in use.

FREDERICK C. BARGAR.